(12) United States Patent
Baba

(10) Patent No.: US 7,468,957 B2
(45) Date of Patent: Dec. 23, 2008

(54) CANCELLER CIRCUIT AND CONTROLLING METHOD

(75) Inventor: Mitsuo Baba, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 603 days.

(21) Appl. No.: 10/975,005

(22) Filed: Oct. 28, 2004

(65) Prior Publication Data

US 2005/0099967 A1 May 12, 2005

(30) Foreign Application Priority Data

Nov. 7, 2003 (JP) ............................. 2003-378320

(51) Int. Cl.
H04B 3/20 (2006.01)
(52) U.S. Cl. ...................................... 370/286
(58) Field of Classification Search ................... 370/286
See application file for complete search history.

(56) References Cited

U.S. PATENT DOCUMENTS

| 5,450,457 | A | * | 9/1995 | Ito et al. ...................... 375/355 |
| 5,675,612 | A | * | 10/1997 | Solve et al. ................... 375/326 |
| 6,028,902 | A | * | 2/2000 | Kiyanagi et al. ............ 375/355 |
| 6,236,645 | B1 | | 5/2001 | Agazzi |

OTHER PUBLICATIONS

Kurt H. Mueller, et al., "Timing Recovery in Digital Synchronous Data Receivers", IEEE Transactions on Communications, vol. COM-24, No. 5, pp. 516-531, May 1976.

Akira Kanemasa, et al., "An ISDN Subscriber Loop Transmission System Based on Echo Cancellation Technique", IEEE Journal on Selected Areas in Communications, vol. SAC-4, No. 8, pp. 1359-1366, Nov. 1986.

Kurt H. Mueller, et al., "Timing Recovery in Digital Synchronous Data Receivers", IEEE Transactions on Communications, vol. COM-24, No. 5, pp. 516-531, May 1976.

* cited by examiner

*Primary Examiner*—Ramnandan Singh
(74) *Attorney, Agent, or Firm*—McGinn IP Law Group, PLLC

(57) ABSTRACT

A canceller circuit includes a subtractor, receiving an analog received signal and a replica signal of noise (e.g., echo and/or crosstalk), for carrying out subtraction on the received signal and the replica signal in a continuous time analog domain, an analog-to-digital converter for converting an analog signal output from the subtractor to a digital signal, an adaptive filter, receiving a noise reference signal and an output signal of the analog-to-digital converter, for outputting the replica signal of noise, as a digital signal, a digital-to-analog converter for receiving and converting a digital signal output from the adaptive filter, to an analog signal, and for supplying the analog signal to the subtractor as the replica signal of noise, and a control circuit for variably controlling the sampling phase in the digital-to-analog converter independently of the sampling phase on the side of the analog-to-digital converter, the phase of the signal waveform of the replica signal of the noise, output from the digital-to-analog converter, being controlled by the control circuit to be coincident with the phase of noise received.

15 Claims, 12 Drawing Sheets

FIG. 9
ECHO/CROSSTALK
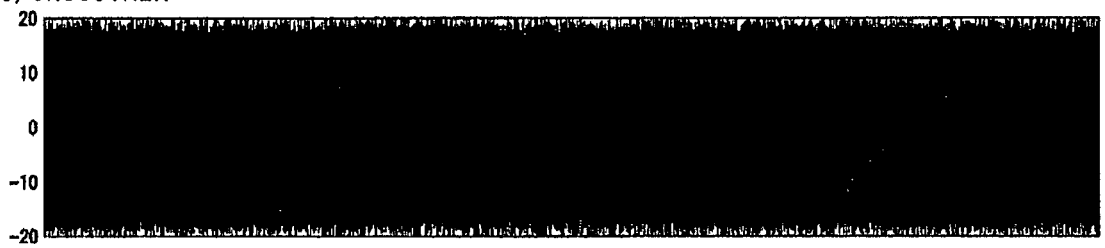
REPLICA SIGNAL
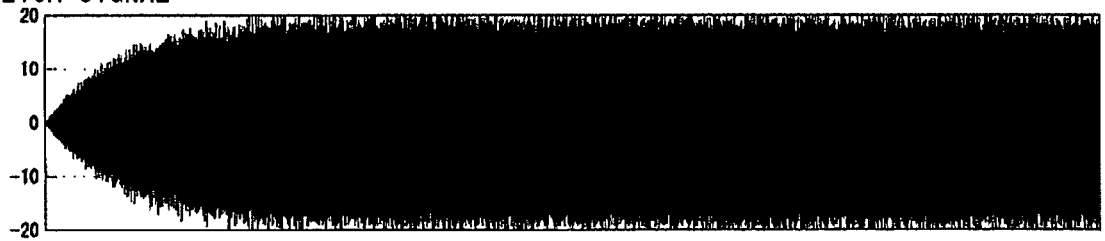
OUTPUT OF ANALOG SUBTRACTOR
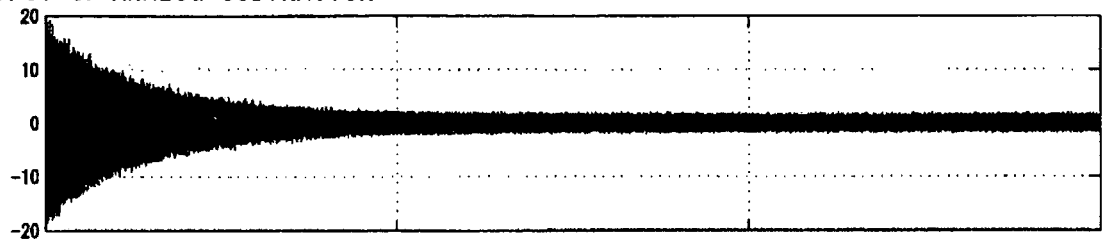
OUTPUT OF AD CONVERTER
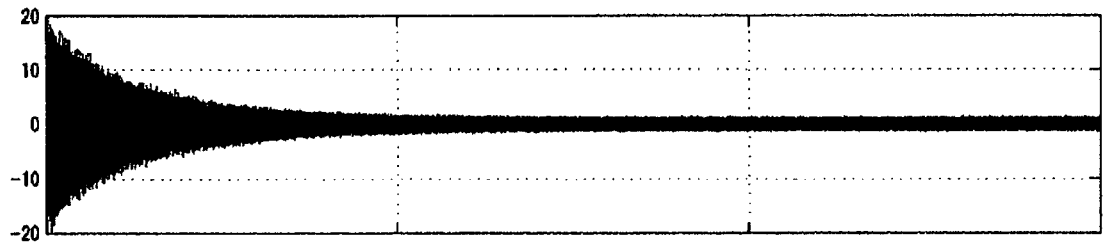

CANCELLER CIRCUIT AND CONTROLLING METHOD

FIELD OF THE INVENTION

This invention relates to a circuit and a method for canceling noise. More particularly, it relates to a canceller circuit and a controlling method for canceling echo/crosstalk.

BACKGROUND OF THE INVENTION

In a communication system for transmitting/receiving signals over e.g., a cable, in particular a system for effecting full-duplex simultaneous bi-directional communication, over the same cable, the performance of a transceiver, in particular that of a receiver circuit, is deteriorated by an echo, which is a reflected signal of the signal transmitted from the same transceiver device, produced by impedance mismatching of a transmission line, or the crosstalk ascribable to spatial capacitance coupling from the other cable. Hence, a need exists for a canceller function for canceling the effect of echo/crosstalk in the received signal to reproduce a true received signal.

In a conventional canceller function, a continuous time analog signal waveform in general is once converted by an analog-to-digital converter (termed also as AD converter) to a discrete-time digital signal, obtained on quantizing the amplitude, and the effect of the echo and the cross-talk is canceled by digital signal processing employing a digital adaptive filter (see, for example, the Patent Document 1 referred to below). It is noted that the period of the discrete time corresponds to a reciprocal of the conversion frequency of the AD converter, while the unit of quantization is prescribed by the resolution of the AD converter. As an example of the communication system, forming the background art of the present invention, there is shown in FIG. 11 a gigabit Ethernet (trademark) (Gigabit Ethernet (registered trademark)), having a hybrid and a canceller and configured for performing full-duplex bidirectional operations (see the Patent Document 1 referred to below). In FIG. 11, the communication between a computer 14 and a hub 12 is carried out using a UTP (unshielded twisted pair) of a wire or a cable (formed of copper) 18, operating at 250 Mb/sec, and eight transceivers 20, located at both ends of the UTP 18. A gigabit media independent interface (GMII) 28 receives data in a byte form, at e.g., 125 MHz, to output the data to a physical coding sub-layer (PCS) 30 forming a physical layer. The PCS 30 encodes bit data from the GMII 28 into a 5-level pulse amplitude modulated (PAM) signal. The five signal levels are $-2$, $-1$, $0$, $+1$, $+2$. Both ends of each UTP 18 are provided with the hybrids 26 because these are needed in the full-duplex bidirectional operations. The hybrid 26 controls access to a communication line 16, thereby allowing for full-duplex bidirectional operation between the transceivers 20 at each end of a communication line. The hybrid also functions to isolate a transmitter circuit (TX) 22 and a receiver circuit (RX) 24 associated with the transceiver from each other. This Patent Document 1 discloses the structure of a transceiver 20 in which signals form the hybrids 26 are converted by an AD converter, not shown, to a digital signal at 125 MHz, and in which an output signal of the AD converter is received by in an FIFO (first-in first-out) storage circuit, not shown, and stored therein in the first-in first-out system, so as to be then output to an adaptive filter (feedforward equalizer (FFE)), not shown. The FFE performs adaptive filtering based on the LMS (least mean square) algorithm to correct the distortion by channel equalization and inter-symbol interference (ISI) cancellation. The sum of an output of the FFE, an output of an echo canceller, not shown, and an output of a NEXT cancellation system, is supplied to a detector. There is provided a timing recovery circuit, supplied with an error formed by an output of the detector and an input to the detector, and with the detector output, to send clocks to the FIFO and to the AD converter.

There is also known an echo canceller, as an echo canceller of the ISDN (Integrated Service Digital Network), configured for operating at approximately four times the data rate, in order to cover a signal band of the modified biphase code (see for example the Non-Patent Document 2 referred to below).

[Patent Document 1]
U.S. Pat. No. 6,236,645 (FIGS. 2 and 6)

[Non-Patent Document 1]
AKIRA KANEMASA, AKIHIKO SYGIYAMA, SHIN'ICHI KOIKE, and TETSU KOYAMA, "An ISDN Subscriber Loop Transmission System Based on Echo Cancellation Technique", IEEE JOURNAL ON SELECTED AREAS IN COMMUNICATIONS, pp. 1359-1366, VOL. SAC-4, NO. 8, NOVEMBER 1986

[Non-Patent Document 2]
KURT H. MUELLER AND MARKUS MÜLLER, "Timing Recovery in Digital Synchronous Data Receivers", IEEE TRANSACTIONS ON COMMUNICATIONS, pp. 516-531, VOL. COM-24, NO. 5, MAY 1976.

SUMMARY OF THE DISCLOSURE

In e.g., the Gigabit Ethernet (registered trademark) system, shown in FIG. 11, it is required to raise the signal rate and to achieve high resolution in quantization. Thus, in converting a signal from the hybrid by an AD converter, there is raised a problem in circuit implementation and in economic profitability in connection with the amplitude of an input signal to the AD converter and with the need for raising the operating frequency (conversion frequency), while the problem of the increasing circuit scale of a digital signal processor and that of the possibility in realizing the high speed operation have come to the surface. On the other hand, integration is retained to be difficult to achieve in view of rise in costs and from the economic perspective.

For possibly overcoming such inconvenience, the scheme of canceling the echo/crosstalk in a continuous time domain ahead of the discrete processing ahead of the AD converter to supply the received signal, thus freed of the echo/crosstalk, to the AD converter, is now scrutinized. FIG. 12 schematically shows an exemplary structure of the subject under consideration.

Referring to FIG. 12, a continuous time analog replica signal, equivalent to the echo/crosstalk signal at the receiving point, is generated, using a digital-to-analog converter (referred to as a DA converter) 204, the analog replica signal in the analog signal waveform is subtracted and thereby cancelled from the received signal, similarly in the analog signal waveform, containing the echo/crosstalk, and from which the frequency component not less than one-half the sampling frequency has been removed, and the received signal, freed of the echo/crosstalk, is supplied to an analog input terminal of an AD converter 202.

An output from the AD converter 202 (quantized discrete time digital signal) is supplied to an adaptive filter 203. The adaptive filter 203 sends the digital signal, as a filter output, to a digital input terminal of a DA converter 204, which converts the input digital signal to a discrete time analog signal (such as a zero-order hold), based on a sampling clock, to generate a continuous time analog signal through a linear time-invariant analog low-pass filter, also called a post-filter or a reproducing filter, having a cut-off frequency equal to one-half the sampling frequency, to output the so generated signal as a replica signal of echo/crosstalk to the subtractor 101. The adaptive filter 203 is supplied with an output signal of the AD converter 202, as an error signal ej, while being supplied with an echo/crosstalk reference signal as an input signal x(j). If the adaptive filter is composed by a finite impulse response (FIR) type transversal filter, it outputs the result of convolution processing of the input signal and the filter coefficients hi (impulse response) to vary the filter coefficients, in such a manner as to decrease an error signal (difference between the desired echo/crosstalk and the filter output (replica signal)) based on e.g., the LMS or RMS (Recursive Least Squares) algorithm. It is also possible to perform filter processing, with the magnitude $|G(e^{j\omega})|=\omega/2\sin(\omega T)$, where T is a sampling period, ahead of the input to the DA converter 204, to provide flat magnitude characteristics by cascade connection of $G(e^{j\omega})$ and the post-filter transfer function $H(\omega)$, where $|H(\omega)|=2\sin(\omega T)/\omega)$.

In case the echo/crosstalk has been cancelled out from the received signal, by the replica signal, the input amplitude range of the AD converter 202 may be the range of the true received signal. It is assumed that, in FIG. 12, there is no phase correlation between the received signal, transmitted from the counterpart device, not shown, over the transmission line, and the echo/crosstalk signal.

Moreover, in the structure shown in FIG. 12, each of the adaptive filter 203, the DA converter 204 for converting the output signal of the adaptive filter 203 and the AD converter 202 is so adapted to have a sampling frequency (conversion rate) not less than twice the baud rate, in order to generate the echo/crosstalk replica signal waveform.

However, in case of oversampling, a high-speed type AD converter is needed to render it difficult to implement an economically profitable signal processing system.

Accordingly, it is an object of the present invention to provide a circuit and a method in which oversampling does not have to be carried out in a digital adaptive filter, DA converter or in an AD-converter and in which echo/crosstalk may be cancelled from the continuous time analog signal waveform at e.g., the baud rate.

The above and other objects are attained by a canceller circuit in accordance with one aspect of the present invention, in which a subtractor is provided ahead of an analog-to-digital converter converting an analog signal to a digital signal, for carrying out subtraction on an input received signal and a replica signal of echo/crosstalk in a continuous time analog domain, and in which the canceller circuit comprises an adaptive filter for outputting a replica signal of echo/crosstalk, as a digital signal, based on an input echo/crosstalk reference signal and an output signal of the analog-to-digital converter, and a digital-to-analog converter for converting an input digital signal output from the adaptive filter, to an analog signal, and for supplying the resulting analog signal to the subtractor as the replica signal of echo/crosstalk. The canceller circuit may further comprises a control circuit for variably controlling the sampling phase in the digital-to-analog converter independently of the sampling phase on the side of the analog-to-digital converter. The phase of the signal waveform of the replica signal of echo/crosstalk, output from the digital-to-analog converter, is controlled to be coincident with the phase of the echo/crosstalk received.

The canceller circuit according to the present invention may further comprise a circuit for receiving the digital signal output from the adaptive filter and for effecting clock interchange from a sampling clock signal on the side of the analog-to-digital converter to a sampling clock signal on the side of the digital-to-analog converter, and for sending the digital signal, carried by the sampling clock signal on the side of the digital-to-analog converter, to the digital-to-analog converter.

In another aspect, the present invention provides a canceller circuit comprising a subtractor for outputting an analog signal obtained on subtracting an analog signal supplied to a second terminal thereof from an analog signal supplied to a first terminal thereof, an analog-to-digital converter having an analog input terminal supplied with an analog signal output from the subtractor, the analog-to-digital converter converting the input analog signal to a digital signal which is output at an analog output terminal thereof, an adaptive filter having input terminals supplied with a digital output signal output from the analog-to-digital converter and with an input echo/crosstalk reference signal and an output terminal for sending out a filter output as a digital signal, a first-in first-out storage device for receiving the digital signal output from the adaptive filter to effect writing based on a write clock signal and to effect reading and outputting based on a read clock to effect clock interchanging, a digital-to-analog converter having a digital input terminal supplied with a digital signal output from the first-in first-out storage device, with the digital-to-analog converter converting the input digital signal to an analog signal which is output at an analog output terminal thereof, and first and second variable delay circuits for receiving an input clock signal in common and for variably delaying the input clock signal to output delayed input clock signal as first and second clock signals. The first clock signal, output from the first variable delay circuit, is supplied to the analog-to-digital converter and to the adaptive filter as respective sampling clocks, while being supplied to the first-in first-out storage device as the write clock signal. The second clock signal, output from the second variable delay circuit, is supplied to the FIFO storage device as the read clock signals, while being supplied as sampling clocks for the digital-to-analog converter. A received signal is supplied to the first input terminal of the subtractor. The analog signal output from the digital-to-analog converter is supplied to the second input terminal of the subtractor as a replica signal of echo/crosstalk. The analog-to-digital converter is supplied with a signal corresponding to a received signal from a counterpart device less the echo/crosstalk cancelled out.

In the canceller circuit, according to the present invention, the frequency of the first and second clock signals is equal to the number of times of modulation per second (baud rate).

In another aspect, the present invention provides a controlling method for a canceller circuit including a subtractor at a receiving end in a pre-stage of an analog-to-digital converter, converting an analog signal to a digital signal, with the subtractor performing subtraction on an input received signal and a replica signal of echo/crosstalk in a continuous time analog domain, an adaptive filter for outputting a replica signal of echo/crosstalk, as a digital signal, based on an input echo/crosstalk reference signal and an output signal of the analog-to-digital converter, and a digital-to-analog converter supplied with the digital signal output from the adaptive filter to convert the digital signal to an analog signal to send the analog signal to the subtractor as the replica signal of echo/crosstalk. The method of the present invention comprises a step of variably controlling the sampling phase in the digital-to-analog converter independently of the sampling phase on the side of the analog-to-digital converter, and a step of controlling the phase of the signal waveform of the replica signal of echo/crosstalk, output from the digital-to-analog converter, into coincidence with the phase of the echo/crosstalk received.

In a further aspect, the present invention provides a canceller circuit wherein, in a training mode for phase control, (a) in such a state where the echo/crosstalk reference signal is not supplied to the adaptive filter, the received signal from the counterpart device is not supplied to the subtractor and the replica signal from the digital-to-analog converter is not supplied, a signal formed solely by the echo/crosstalk is supplied to a first input terminal of the subtractor, the delay of the first variable delay circuit is variably controlled based on an output signal from the analog-to-digital converter, the phase of the first clock signal is variably controlled, the delay of the second variable delay circuit is not controlled, and an optimum sampling position of the echo/crosstalk in the analog-to-digital converter is detected;

(b) in such a state where a first input terminal of the subtractor is signal-less with there being no received signal nor the echo/crosstalk from the counterpart device, the echo/crosstalk reference signal being supplied to the adaptive filter and where the replica signal from the digital-to-analog converter is supplied to a second input terminal of the subtractor, the delay of the second variable delay circuit is variably controlled based on the output signal of the analog-to-digital converter, the phase of the second clock signal is controlled, the delay of the first variable delay circuit is not controlled, the phase of the replica signal, output from the digital-to-analog converter, is controlled to be coincident with the phase of the echo/crosstalk received;

(c) the phase of the first and second clock signals is not controlled and is left unattended, with the echo/crosstalk and the replica signal being entered to the first and second input terminals of the subtractor, respectively;

the analog-to-digital converter being supplied with a difference signal of the echo/crosstalk and the replica signal, output from the subtractor;

the adaptive filter being supplied with an output signal of the analog-to-digital converter as an error and with the echo/crosstalk reference signal and adaptively varying the filter coefficients for decreasing an error between a filter output signal and the echo/crosstalk as a target signal to effect equalization pull-in to cancel the echo/crosstalk from an output of the subtractor.

In a further aspect of the present invention, there is provided a transceiver apparatus having the above canceller circuit. In a further aspect of the present invention, there is provided a communication system including a hybrid circuit and a transceiver apparatus on each end of a communication channel formed by a cable or a wire. The transceiver apparatus includes the canceller circuit of the present invention, in order to effect full-duplex bidirectional communication.

The meritorious effects of the present invention are summarized as follows.

According to the present invention, oversampling is not needed in the adaptive filter, in the digital-to-analog converter, nor in the analog-to-digital converter, while the echo-crosstalk signal may be brought into coincidence in the analog subtractor. The effect of the echo-crosstalk signal may be cancelled out from the input signal of the analog-to-digital converter. The present invention may be applied with advantage to a high-speed communication system because integration may be facilitated both technically and economically.

Still other objects and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 9 shows the results of simulation of an embodiment of the present invention.

PREFERRED EMBODIMENTS OF THE INVENTION

Figure 1:
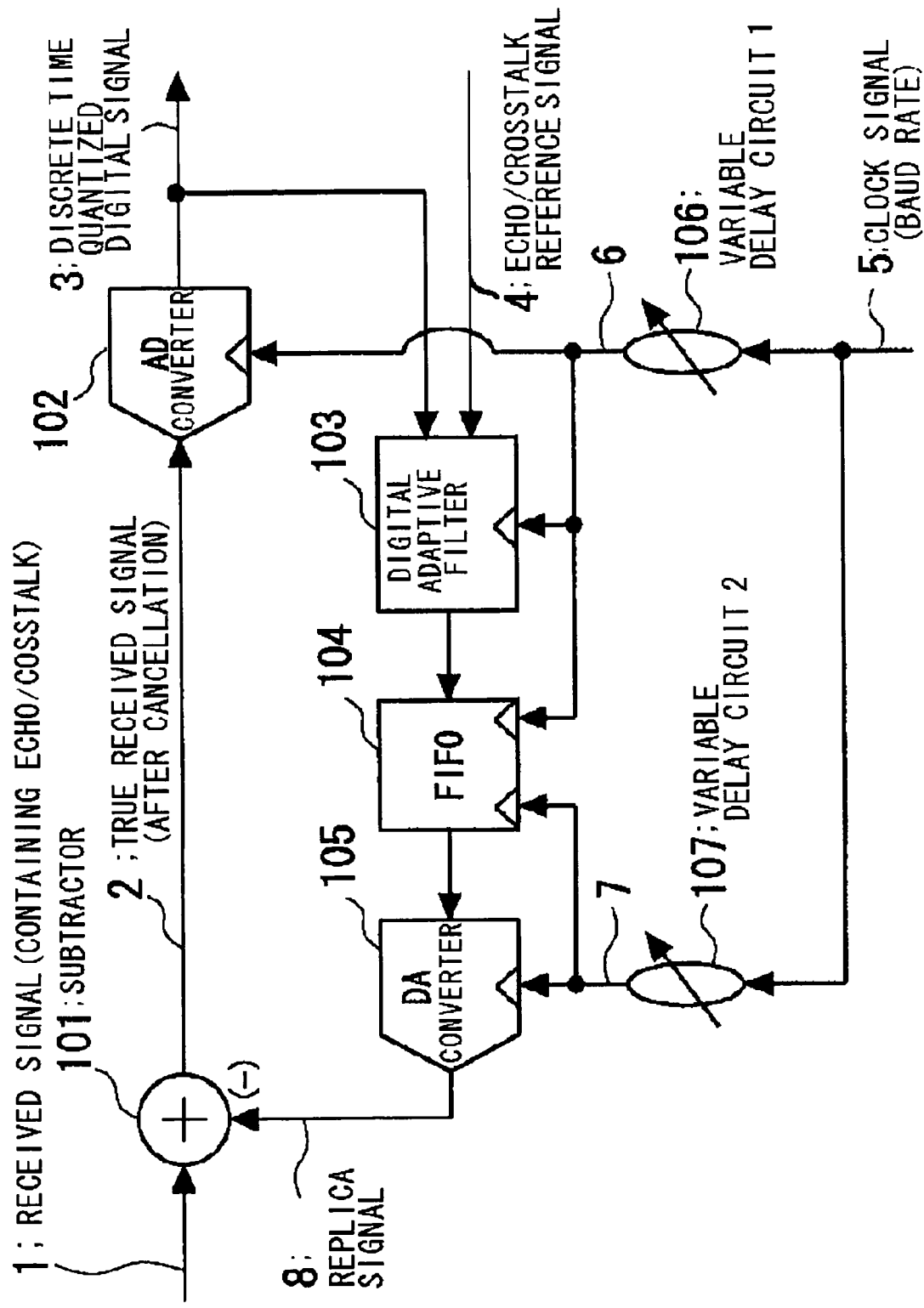
FIG. 1 shows the structure of an embodiment of the present invention.

The present invention is hereinafter explained in further detail with reference to the accompanying drawings. In a preferred embodiment of the present invention, a variably delayed clock signal is supplied to a digital-to-analog converter for generating a replica signal waveform of the echo/crosstalk, whilst the phase of an output signal of a subtractor for subtracting the output signal of the digital-to-analog converter from the received signal, is designed so as to be controllable independently of clock signals supplied to an adaptive filter and an analog-to-digital converter. More specifically, the canceller circuit according to an embodiment of the present invention includes a subtractor 101 which outputs a signal equal to an analog signal supplied at a first input terminal less an analog signal supplied at the second input terminal, and an analog-to-digital converter 102, having its analog input terminal supplied with an analog signal output from the subtractor 101, converting the input analog signal to a digital signal and outputting the resulting digital signal at a digital output terminal. The canceller circuit also includes an adaptive filter 103, supplied with a digital signal 3, output from the analog-to-digital converter, and with an echo/crosstalk reference signal 4, and having a filter coefficient variable adaptively, and an FIFO storage unit 104 for writing a digital output signal, output from the adaptive filter 103, based on a write clock signal, and for reading out the signal based on a read clock signal, by way of effecting clock interchange. The canceller circuit further includes a digital-to-analog converter 105, having its digital input terminal supplied with the digital signal output from the FIFO storage unit 104, and converting the input digital signal to an analog signal, which is output at its analog output terminal, and first and second variable delay circuits 106 and 107, supplied with an input clock signal 5 in common, variably delaying the input clock signals and outputting the delayed clock signals as first and second clock signals.

A first clock signal 6, output from the variable delay circuit 106, is supplied as sampling clocks for driving the analog-to-digital converter 102 and the adaptive filter 103, while being supplied to the FIFO storage unit 104 as the aforementioned write clock signals. Meanwhile, the conversion rate of the analog-to-digital converter 102 is prescribed by the input sampling clocks.

The second clock signal 7, output from the second variable delay circuit, is supplied to the FIFO storage unit 104, as the, aforementioned read clock signal, while being supplied as the sampling clock to the digital-to-analog converter 105. The conversion rate of the digital-to-analog converter 105 is prescribed by the input sampling clocks.

A received signal 1, including the echo/crosstalk, is supplied to a first input terminal of the subtractor 101, whilst an analog signal, output from the digital-to-analog converter 105, is supplied to a second input terminal (−) of the subtractor 101. An analog input terminal of the analog-to-digital converter 102 is supplied with a true received signal, corresponding to a received signal from a counterpart device from which the echo/crosstalk has been canceled.

In the present embodiment, the frequency of the input clock signal 5 is preferably set so as to be equal to the baud rate (number of times of modulation per second).

In the present embodiment, the digital-to-analog converter 105 includes a filter for cutting frequency components not less than half the sampling frequency of an analog signal converted from the input digital signal (for example, a zero-order hold) to output a continuous time analog signal. Such filter is a low-pass filter having a cut-off frequency equal to one-half the sampling frequency.

In the present embodiment, the canceller circuit in the phase control training mode at least executes the following procedure (processing steps):

[Step A]
The first input terminal of the subtractor 101 is not supplied with the received signal from the counterpart device, not shown, nor with the echo/crosstalk reference signal, nor with the replica signal, but is supplied only with the echo/crosstalk. The delay of the first variable delay circuit 106 is variably controlled, on the basis of the output signal from the analog-to-digital converter 102 to variably control the phase of the first clock signal 106 to detect the optimum sampling position of the echo/crosstalk in the analog-to-digital converter 102.

[Step B]
In a signal-less state, devoid of both of the received signal from the counterpart device, not shown, and the echo/crosstalk, the echo/crosstalk reference signal 4 is supplied to the adaptive filter 103. The second input terminal (−) of the subtractor 101 is supplied with a replica signal 8 from the digital-to-analog converter 105, and the delay of the second variable delay circuit 107 is variably controlled based on the output signal from the analog-to-digital converter 102. On the other hand, the delay of the first variable delay circuit 106 is not controlled, but the phase of the second clock signal 7 is variably controlled in such a manner that, in the optimum sample position of the first clock signal 6 of the analog-to-digital converter 102, the phase of the replica signal 8 from the digital-to-analog converter 105 is controlled to be coincident with the phase of the echo/crosstalk.

[Step C]
The phases of the first and second clock signals 6 and 7 are then fixed (that is, the first and second variable delay circuits are not controlled and the respective delays are fixed). The echo/crosstalk and the replica signal 8 are supplied to the first and second input terminals of the subtractor 101. The analog-to-digital converter 102 is supplied with a difference signal between the echo/crosstalk and the replica signal, which is output from the subtractor 101. The adaptive filter 103 is supplied with an output signal from the analog-to-digital converter 102 as an error signal, and with the echo/crosstalk reference signal 4, as an input signal. The adaptive filter 103 has its filter coefficients adaptively changed for decreasing the difference between the replica signal, obtained on converting the filter output to an analog signal by the digital-to-analog converter 105, and the echo/crosstalk, as a target signal (desired signal) will be decreased, by way of performing equalization pull-in processing. This cancels out the echo/crosstalk from the output of the subtractor 101.

In the present embodiment, a timing controller 108, supplied with the digital signal output from the analog-to-digital converter 102 to variably control the delay time of the first and second variable delay circuits, may be provided within the canceller circuit.

Figure 12:
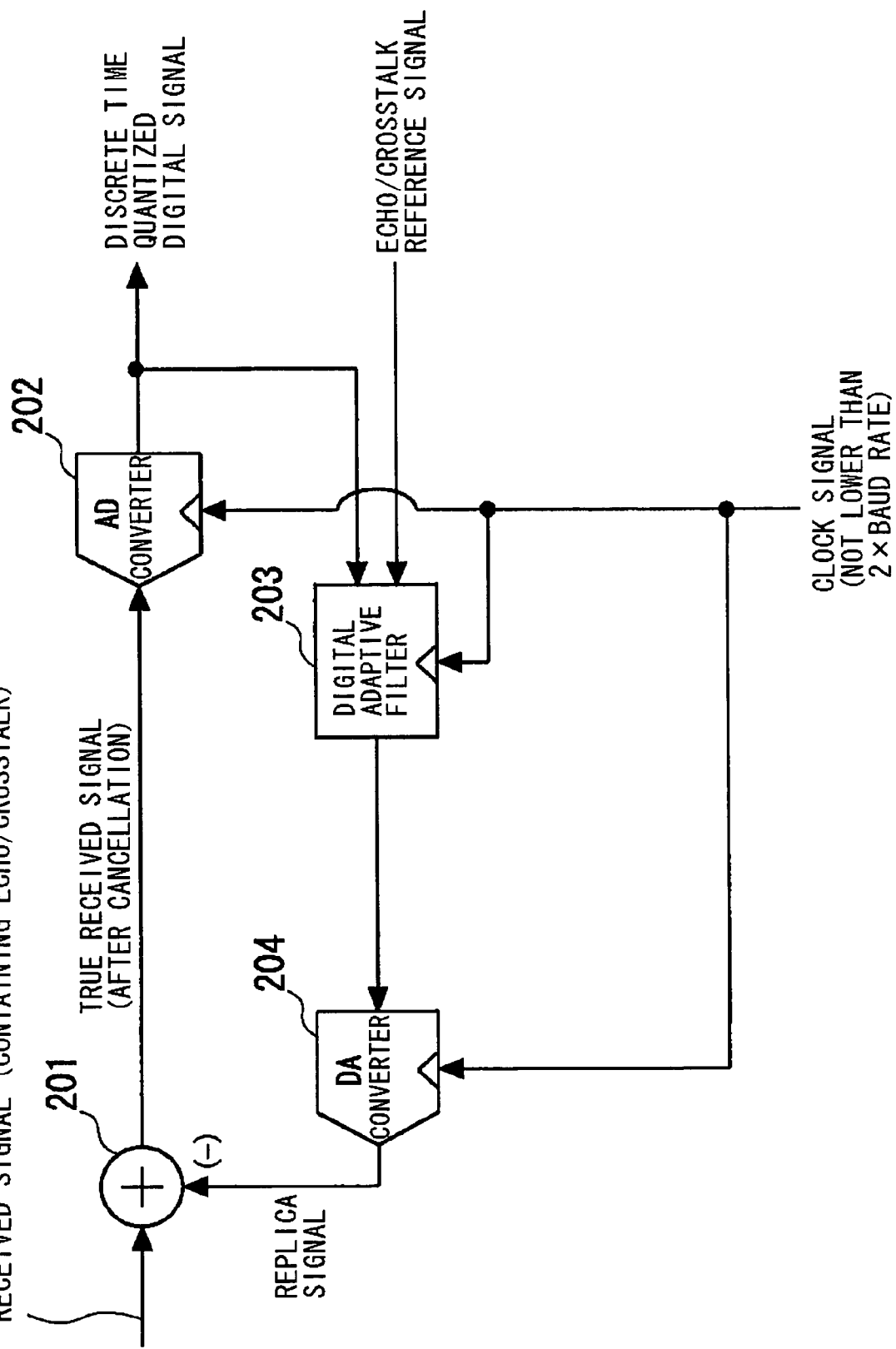
FIG. 12 illustrates the structure of a canceller circuit as a subject of comparison.

In the above-described embodiment, a clock signal 7, obtained on delaying the input clock signal 5 by the second variable delay circuit 107, is supplied to the digital-to-analog converter 105 for generating a replica signal waveform, in order to effect optimum control of the phase of the replica signal 8 of the echo/crosstalk independently of the clock signal 6 supplied to the analog-to-digital converter 102 and to the adaptive filter 103. In the present embodiment, the digital-to-analog converter 105 for generating the replica signal, adaptive filter 103 and the analog-to-digital converter 102 operate at a baud rate. Over-sampling is unnecessary, and the baud rate sampling operation may be carried out. By this configuration, high speed circuit operation may be realized in implementing e.g., the next generation 10 Gbps (10 gigabit/second) copper cable transmission, while the circuit scale may be suppressed to less than one-half. That is, the power dissipation/circuit area may be reduced appreciably as compared to that of the over-sampling configuration shown for example in FIG. 12.

Embodiments

The present invention is hereinafter explained by taking a concrete example. Referring to FIG. 1, the present example includes an analog subtractor, referred to as a subtractor 101, for subtracting a continuous time analog signal, an analog-to-digital converter, referred to as an AD converter 102, a digital adaptive filter, referred to as an adaptive filter 103, a first-in first-out (FIFO) storage unit for clock interchanging, referred to as FIFO 104, a digital-to-analog converter, referred to as a DA converter 105, a first variable delay circuit 106 and a second variable delay circuit 107. Ahead of the subtractor 101, there is provided a hybrid, not shown (a hybrid is shown as a reference numeral 26 in FIG. 11). An output signal from the hybrid, entered to a first input terminal of the subtractor 101, has frequency components, not less than one-half the sampling frequency, cut by a low-pass filter, not shown.

The subtractor 101 is supplied with the received signal 1, containing the echo/crosstalk, output from the hybrid, not shown, and with a replica signal 8, generated by the DA converter, and executes waveform subtracting processing in the analog continuous time domain to output a signal from which the echo/crosstalk has been canceled (subtracted).

Whilst the subtractor 101 may be formed by any suitable analog subtractor, it may be formed by a differential circuit including an operational transconductance amplifier (OTA), having a non-inverting input terminal and an inverting input terminal, supplied with the received signal 1 and with the replica signal 8, respectively. The differential circuit is configured for converting the differential current of the output currents from the output pair of the OTA into a voltage to output the voltage.

The AD converter 102, supplied with an as-canceled analog signal, output from the subtractor 101, converts the input analog signal to a digital signal obtained on quantizing the input analog signal along the amplitude direction in the discrete time domain, at a timing of an input sampling clock signal 6, and outputs the so produced discrete time quantized digital signal. The AD converter 102 is formed by e.g., a flash (parallel) type AD converter, depending on the required conversion rate.

The adaptive filter 103 is supplied with the discrete time quantized digital output signal, sometimes abbreviated to an output signal, output from the AD converter 102, and with a reference signal as an echo/crosstalk source 4, referred to as echo/crosstalk reference signal 4, and executes filtering processing on the echo/crosstalk reference signal 4, in synchronization with the clock signal, in such a manner that a filter output (analog replica signal 8 by the D/A converter 105) will be coincident with a received echo/crosstalk as a target signal (desired signal) d, using an output digital signal 3 from the AD converter 102 (corresponding to an output signal from the subtractor 101) as an error signal. The adaptive filter 103 includes e.g., a FIR (finite impulse response) type transversal filter, having variably settable tap coefficients. The adaptive filter 103 has its filter coefficients adaptively determined so that an error $e_j$ (output of the subtractor 101) between a filter output $y_j$ (replica signal) and a target value $d_j$ (received echo/crosstalk as supplied to the subtractor 101) will be decreased with respect to an input $x_j$ (echo/crosstalk reference signal 4). For calculating an optimum filter coefficient which will minimize the evaluation function with respect to the error signal, LMS or RMS algorithms, for example, may be used. The adaptive filter 103 may, of course, be formed by an infinite impulse response (IIR) filter.

An output signal from the adaptive filter 103 is written at an address indicated by a write address pointer, not shown, with the clock signal 6 as a write clock, in an FIFO 104 which performs the replacement of clock signals. The signal is output from an address indicated by a readout address pointer, not shown, with the clock signal 7 as a read clock, with a time delay corresponding to a preset phase, so as to be supplied to a digital input terminal of the DA converter 105. This FIFO 104 plays the same function as that of a so-called elastic storage buffer.

The DA converter 105, supplied with the digital signal from the FIFO 104, converts the input digital signal to an analog signal, with the clock signal 7 as a conversion clock, and outputs an analog signal (continuous time analog signal), processed with low-pass filtering in which a cut-off frequency is the Nyquist frequency (one-half of the baud rate frequency).

The first variable delay circuit 106 controls the delay time of the clock signal 5 so that the phase of the clock signal 6, supplied to the AD converter 102, will be an optimum sampling phase (phase which will maximize the power) for the as-canceled received signal 2 from the subtractor 101. The adaptive filter 103 and the FIFO 104 are each supplied with the clock signal of the same phase as the clock signal 6 supplied to the AD converter 102.

The second variable delay circuit 107 controls the phase of the clock signal 7, supplied to the DA converter 105, so that the phase of the replica signal 8 will be coincident with the phase of the received echo/crosstalk at the subtractor 101. In the present embodiment, the delay by the first and second variable delay circuits 106 and 107 is controlled from a controller, not shown, supplied with the output digital signal 3 of the AD converter 102 as an input. The first and second variable delay circuits 106 and 107 are each formed by an arbitrary variable delay circuit, adapted for changing the delay time according to a control signal, to output the resulting delayed signal, e.g., by an interpolator which is adapted to delay the rising edge or the falling edge of the input signal based on the control signal. Alternatively, a plural number of stages of unit delay elements may be provided and connection points (taps) of the unit delay elements may then be connected to a selector which selects a tap from which a signal is taken out based on a control signal. A DLL (delay lock loop) may, of course, be used.

As a technique for making adjustment to an optimum timing phase, in the delay control by the first and second variable delay circuits 106 and 107, based on a signal sampled at the baud rate (output digital signal 3 of the AD converter 102), any suitable known technique may be used. For example, as a method for finding an optimum timing phase in a timing recovery circuit for a synchronization type data receiver for a binary valued signal or a N-level PAM (N; positive integer larger than 2) signal, there is known such a technique in which an estimated value which will substantially minimize the variance of the timing offset is obtained from a signal sampled at the baud rate (modulation rate) to find an optimum timing phase (see, for example, the aforementioned Non-Patent Document 2). In this Non-Patent Document 2, there is disclosed a technique for sampling the input signal at a baud rate and processing the sampled signal to generate a control signal used for adjusting the timing phase. The technique disclosed in this Non-Patent Document 2, enabling the timing phase to be adjusted only from the Nyquist-processed sampled signal, may be applied to the present embodiment. The schematics of this technique reside in correcting the timing phase, based on an estimated value $z_k = g_k^T x_k$, which is an inner product of a sampled signal vector $x_k$ and a weight vector $g_k$ having the function of a data symbol as an element. An expectation $E\{z_k\}$ of the estimated value prescribes a timing function $f(\tau)$ crucial for the sampled phase in the stationary state and the transfer function of the control loop. The timing function $f(\tau) = \Sigma u_i h_i$, where $u_i$ is a dimensionless coefficient for normalization, may be calculated from the signal sampled at the baud rate and the impulse response $h_i$ which is estimated from the sample data. If, in the synchronization type baseband transmission system, with the overall impulse response being h(t), $a_k$ is a symbol and n(t) is the Gaussian noise, the following equation may be obtained:

$$x(t) = \Sigma_k a_k h(t-kT) + n(t)$$

Such a weight which will minimize the variance of $z_k$ is found, and the timing phase, controlling the delay of the first and second variable delay circuits 106 and 107 of the present embodiment, is adjusted. For the timing function $f(\tau)$ and details of the algorithm, see the aforementioned Non-Patent Document 2.

Figure 2:
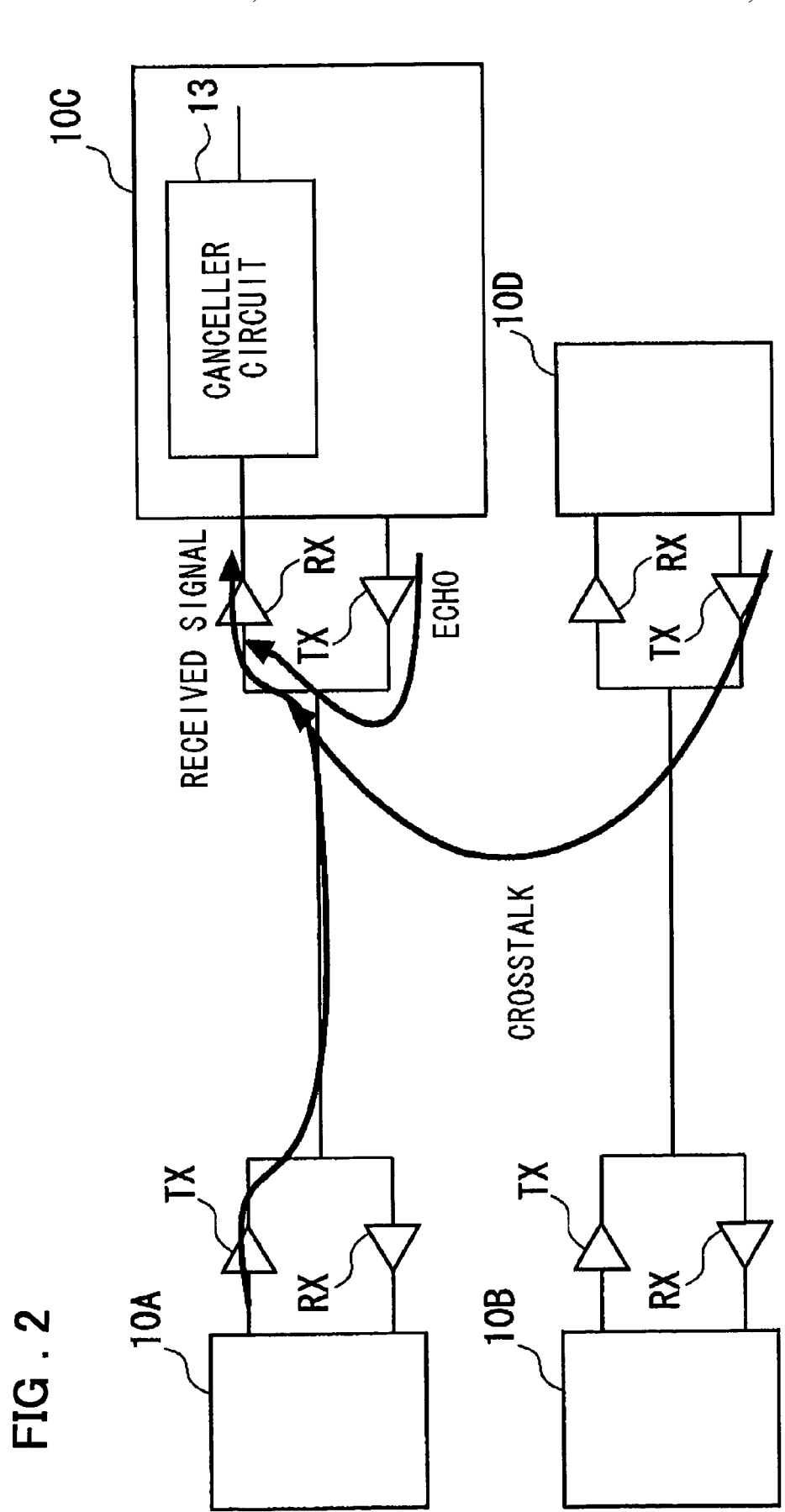
FIG. 2 is a schematic view for illustrating the echo/crosstalk in an embodiment of the present invention.

The echo/crosstalk signal, mixing into the received signal, in the present embodiment, is explained with reference to FIGS. 2 and 3. The echo is such a phenomenon in which, in a full-duplex bidirectional communication system, a transmission signal from a transmitter circuit (TX) of an own apparatus (10C of FIG. 2) turns around to a signal received by a receiver circuit (RX) of the own apparatus. The crosstalk (remote-end or near-end crosstalk) is such a phenomenon in which, in a transmission/reception system employing plural transmission lines, a signal from a different transmission line (a transmission line between the devices 10B and 10D) turns around to a signal received by a receiver circuit (RX) of the own apparatus (10C of FIG. 2). The canceller of FIG. 1 corresponds to the canceller circuit 13 of FIG. 2. A hybrid circuit, not shown in FIG. 2, is provided in a connecting portion across the transmitter circuit (TX) and the receiver circuit (RX).

Figure 3:
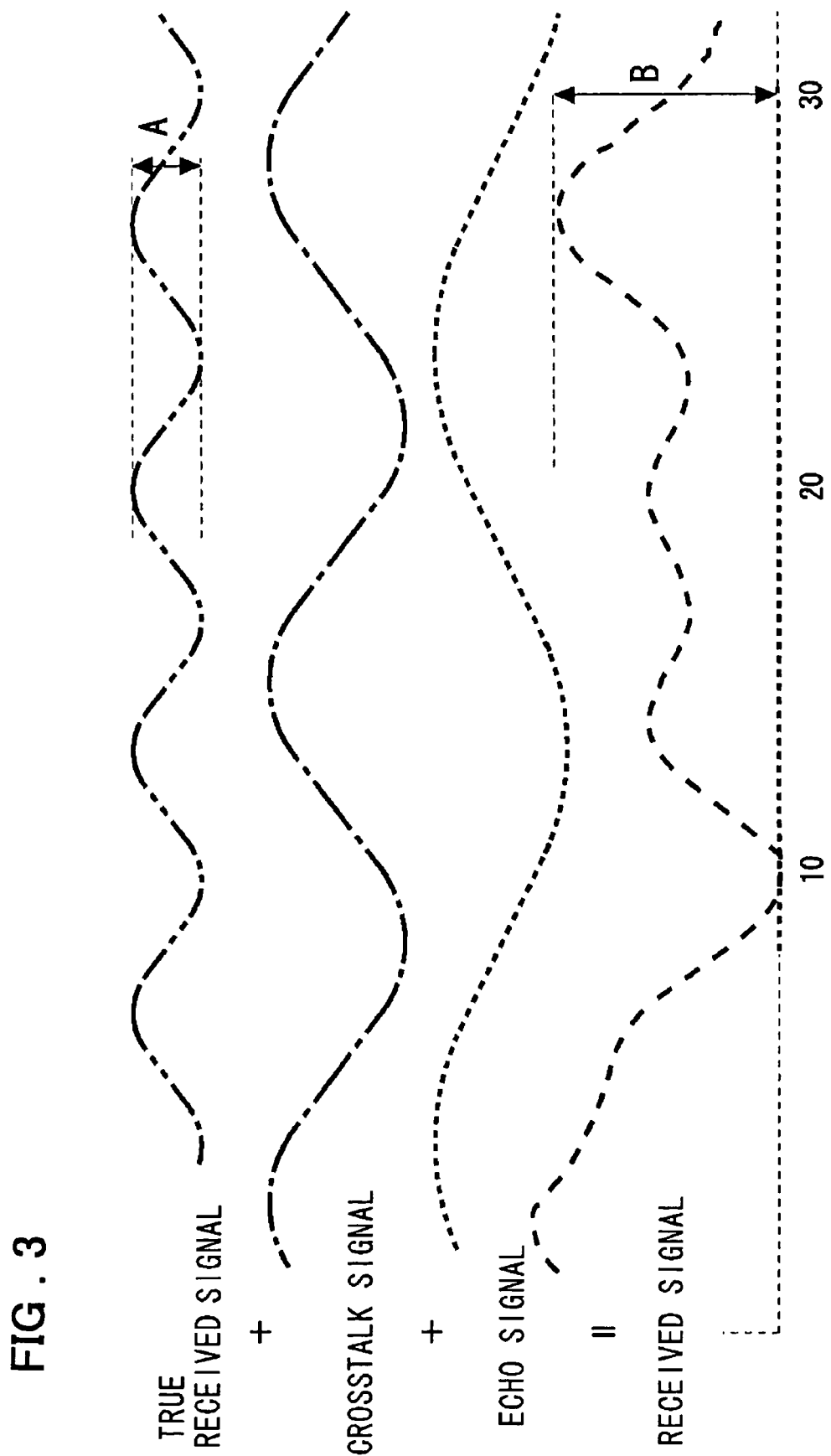
FIG. 3 is a schematic view for illustrating the relationship between the echo/crosstalk and received signals in an embodiment of the present invention.

FIG. 3 schematically shows the effect of the echo/crosstalk on received signal. In the absence of the echo/crosstalk, the amplitude of the analog input signal to the AD converter 102 is A. If affected by the echo/crosstalk, the amplitude of the analog input signal to the AD converter 102 is B. Hence, an input range of the AD converter 102 needs to deal with the amplitude B. That is, if the precision of the quantization step of the AD converter 102 is such as is able to deal with the range A, additional resolution is needed in order to deal with the range B. Conversely, with the present embodiment, the analog input signal to the AD converter 102 is the received signal from which the echo/crosstalk has been cancelled, such that the input amplitude of the AD converter 102 is A, and hence the problem (e.g., increase in the resolution of the AD converter) may be evaded. Moreover, with the present embodiment, the sampling rate of the AD converter 102 is suppressed to the baud rate and hence the oversampling is unnecessary.

Then, phase control of the first and second variable delay circuits 106 and 107 in the present embodiment is explained. FIGS. 4 to 7 show the typical processing for phase control training in the present embodiment, step-by-step.

Figure 4:
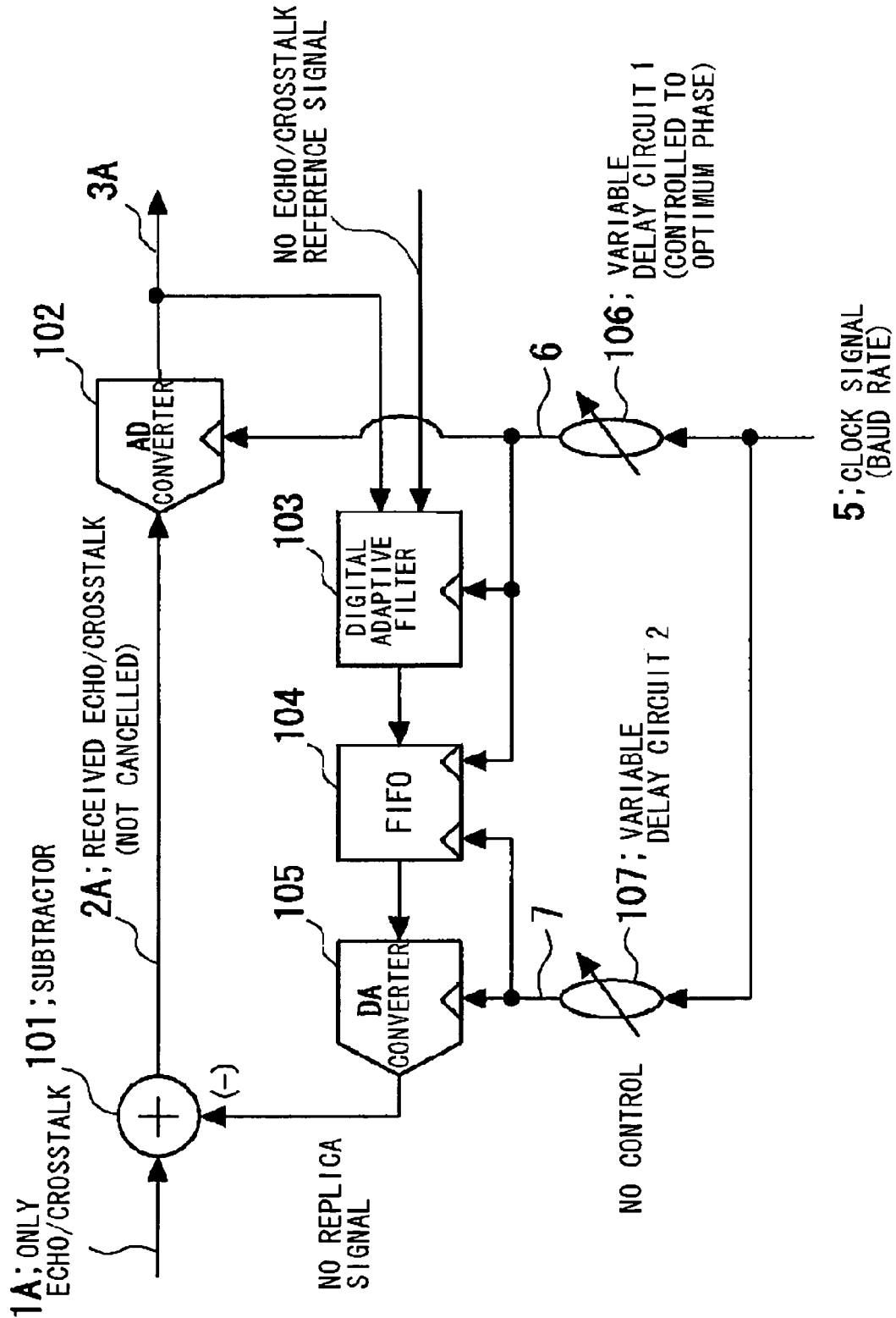
FIG. 4 illustrates the training process in an embodiment of the present invention.

First, in a system where there exists only the echo/crosstalk, the delay in the first variable delay circuit 106 is variably controlled to detect the optimum phase of receipt of the echo/crosstalk by the AD converter 102 (sampling phase), using the information detected by AD converter 102, as shown in FIG. 4. At this time, the delay of the second variable delay circuit 107 is not controlled (the delay of the second clock signal 7 is fixed). That is, only the echo/crosstalk 1A is supplied to the subtractor 101, whilst neither the received signal from the counterpart device nor the replica signal from the DA circuit 105 is supplied. The AD converter 102 is supplied with received echo/crosstalk 2A, which has not been cancelled out. The adaptive filter 103 is not supplied with the echo/crosstalk reference signal. In case the adaptive filter 103 is a transversal filter, as an example, the filter output, as the result of the convolution of the input signal and the impulse response, is zero, such that the DA converter 105 outputs an analog signal corresponding to a zero value. An optimum sample phase of the echo/crosstalk is detected based on an output digital signal 3A of the AD converter 102 supplied with the echo/crosstalk (non-cancelled) 2A to convert the non-cancelled echo/crosstalk to a digital signal. For example, such phase is detected which will maximize the power over a preset period of the sampled output digital signal 3A. Or, the timing phase may be controlled using the technique disclosed in the aforementioned Non-Patent Document 2.

Figure 5:
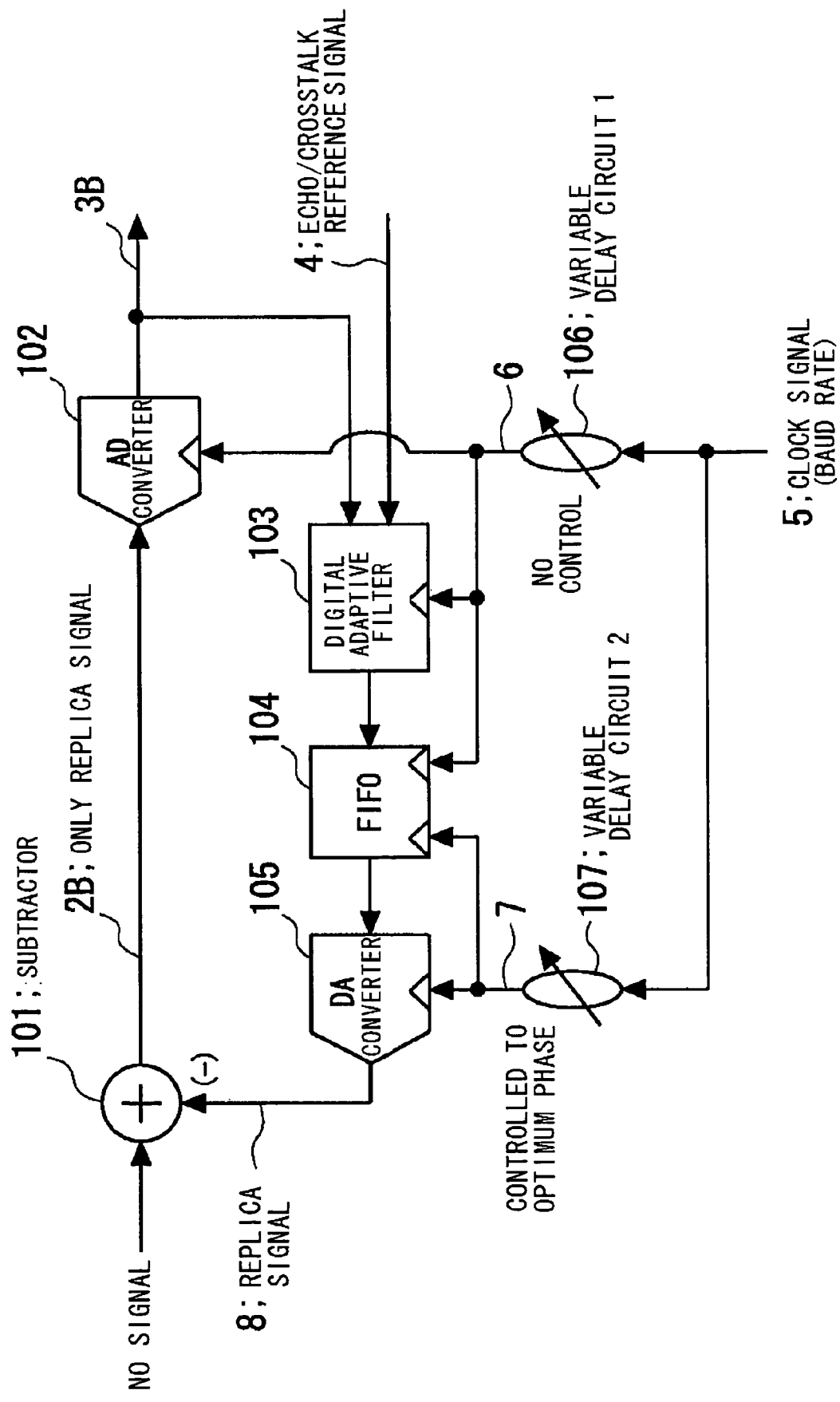
FIG. 5 illustrates the training process in an embodiment of the present invention.

Then, no signal is supplied to the first input terminal of the subtractor 101 and a replica signal 8 is supplied to the second input terminal (−) of the subtractor 101, as shown in FIG. 5. The output of the subtractor 101 is a signal 2B only of the replica signal, with there being no received signal from the counterpart device nor echo/crosstalk. The delay of the second variable delay circuit 107 is controlled to an optimum phase using an output digital signal 3B output from the AD converter 102 which is supplied with a signal 2B formed only by the replica signal to convert the input analog signal to a digital signal. In this case, the first variable delay circuit 106 is not subjected to delay control. In this manner, in the sampling position of the AD converter 102, detected by the sequence shown in FIG. 4, the phase of the replica signal 8 output from the DA converter 105 to the subtractor 101, may be brought into coincidence with the phase of the echo/crosstalk received.

Figure 6:
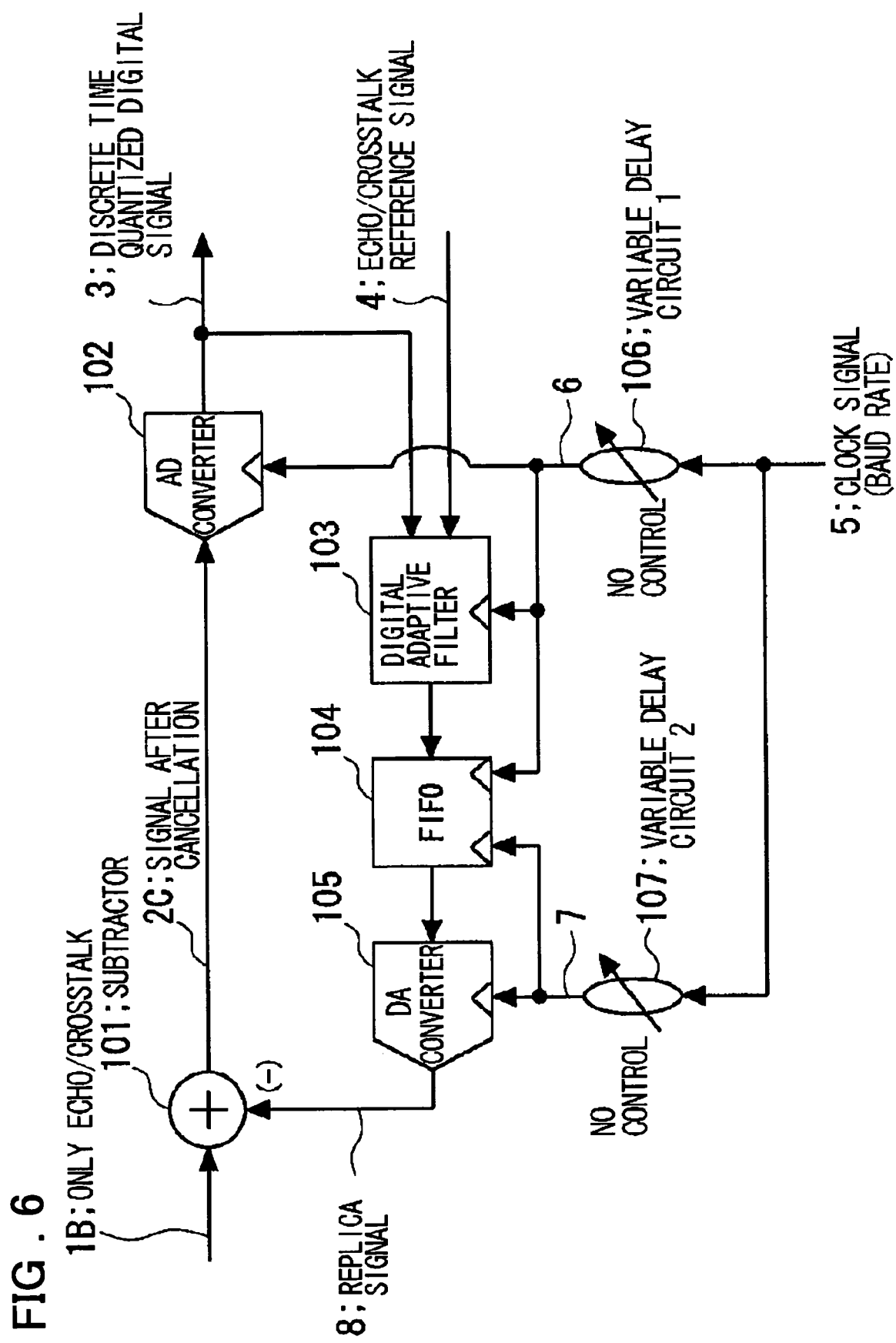
FIG. 6 illustrates the training process in an embodiment of the present invention.

Then, echo/crosstalk 1B and the replica signal 8, actually received, are supplied respectively to the first and second input terminals of the subtractor 101 and the adaptive equalizing processing by the adaptive filter 103 is performed, as shown in FIG. 6. Meanwhile, the frequency components not less than one-half the sampling frequency are cut from the echo/crosstalk 1B.

By so doing, the as-cancelled signal, that is, an output signal 2C of the subtractor 101, becomes nil from an idealistic view point. In this case, neither the first variable delay circuit 106 nor the second variable delay circuit 107 is subjected to delay control. That is, the phases of the first and second clock signals 6 and 7 are maintained at an optimum phase as set in the sequence shown in FIGS. 4 and 5.

Figure 7:
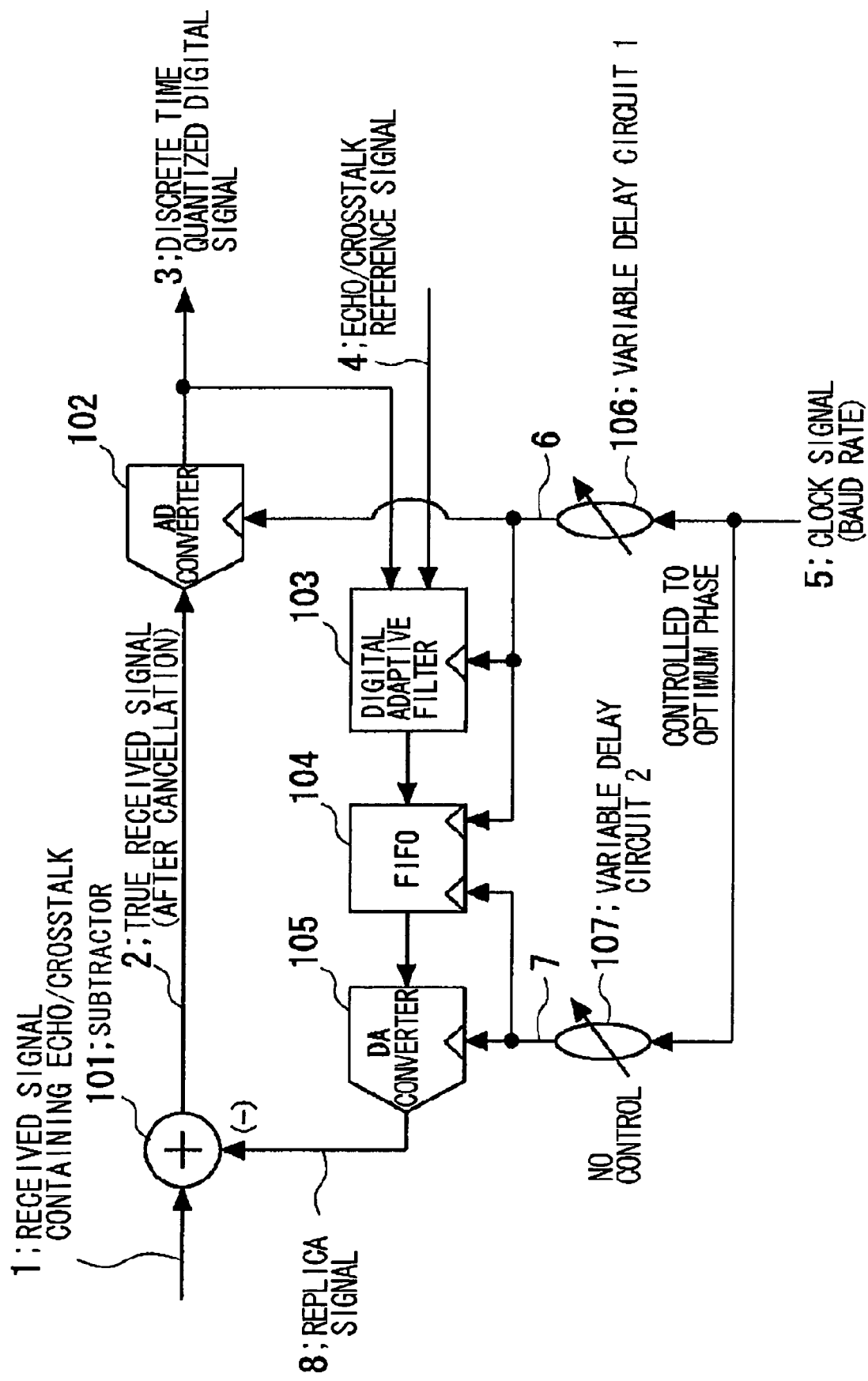
FIG. 7 illustrates the usual operation of an embodiment of the present invention.

FIG. 7 shows the normal state in the present embodiment. The delay in the first variable delay circuit 106 is controlled to provide an optimum sampling phase in the received signal (inclusive of the echo/crosstalk) 1 from the counterpart device, not shown. The second variable delay circuit 107 is not subjected to delay control.

Figure 8:
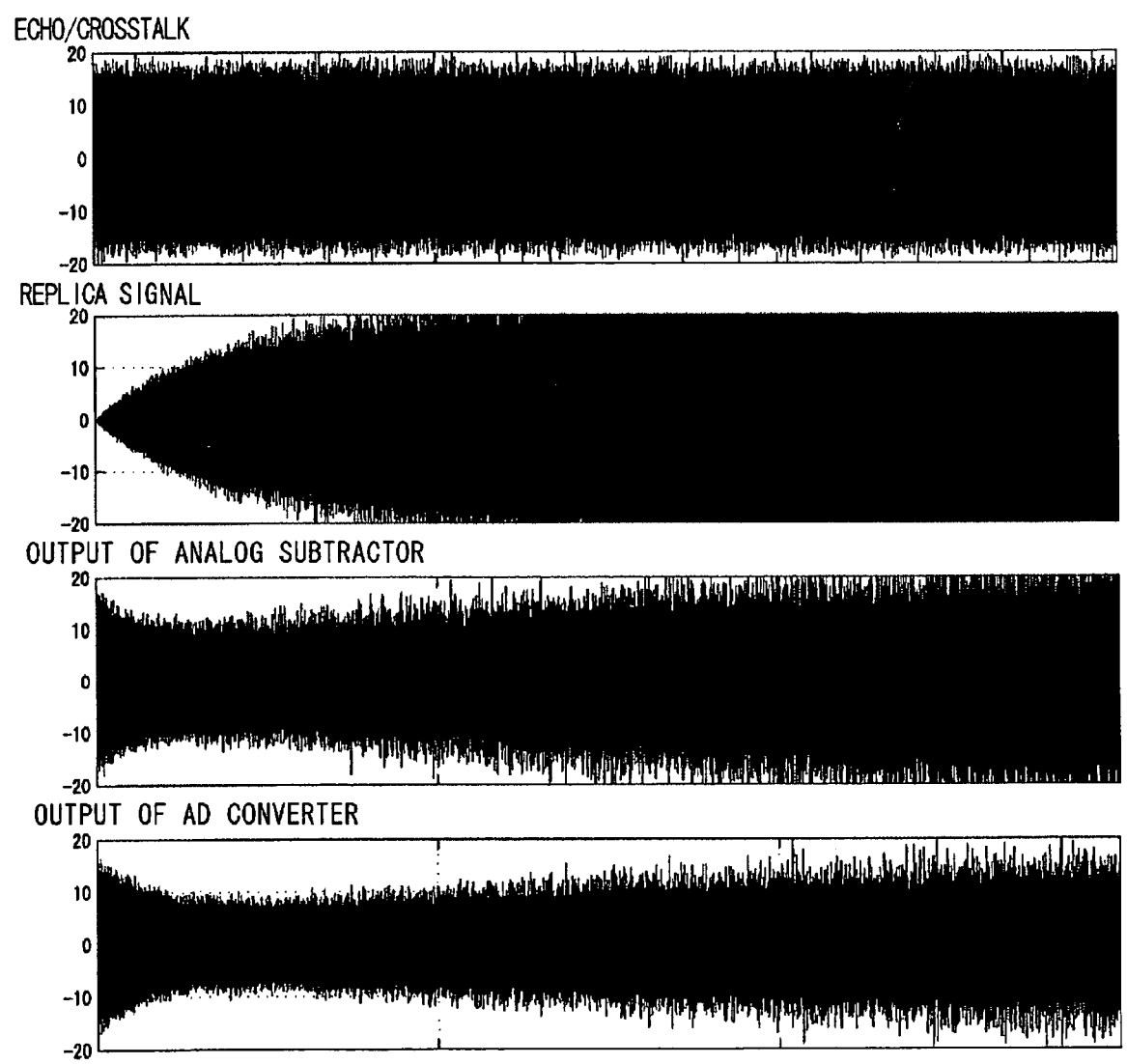
FIG. 8 shows the results of simulation of a Comparative Example.

FIGS. 8 and 9 show the result of simulation conducted for verifying the present embodiment with the aid of MATLAB used in the simulation of control system or DSP (digital signal processing). More specifically, FIGS. 8 and 9 show the pull-in process of the adaptive filter 103 in the system shown in FIG. 1, using a 16-level amplitude modulation signal (PAM), as a signal source. FIGS. 8 and 9 show, from above towards below, echo/crosstalk received, the replica signal 8 from the DA converter 105, an output from the subtractor 101, following analog subtraction, and an output digital signal 3 of the AD converter 102, in this order.

FIG. 8 shows a Comparative Example in which sampling phase control of the replica signal 8, that is, the delay control of the second variable delay circuit 107, is not carried out in the canceller circuit which effects baud rate sampling shown in FIG. 1. It is seen from this figure that echo/crosstalk is not canceled at a stage following the conversion by the AD converter 102, which has effected discrete time sampling, nor in the continuous time domain following the subtractor 101, so that the input amplitude to the AD converter 102 is amplified.

FIG. 9 shows the case where the sampling phase control of the replica signal 8 (the delay control of the second variable delay circuit 107) is made in accordance with the above-described embodiment. As may be seen from FIG. 9, echo/crosstalk has been canceled at a stage in the continuous time domain following the subtractor 101 and at a stage following the conversion by the AD converter 102.

This is made possible in the present embodiment because the phase of the replica signal waveform is made controllable by the second variable delay circuit 107 in the DA converter 105 responsible for generating a replica signal 8 in the analog continuous time domain, such that the echo/crosstalk signal and the replica signal can be brought into coincidence with each other in the subtractor 101 which performs the cancellation processing with the operation of analog waveforms.

With the present embodiment, the oversampling configuration of the adaptive filter 103, DA converter 105 and the AD converter 102 is not needed and, in its stead, the echo/crosstalk canceller in the analog continuous time configuration may be achieved with the baud rate processing configuration.

Figure 10:
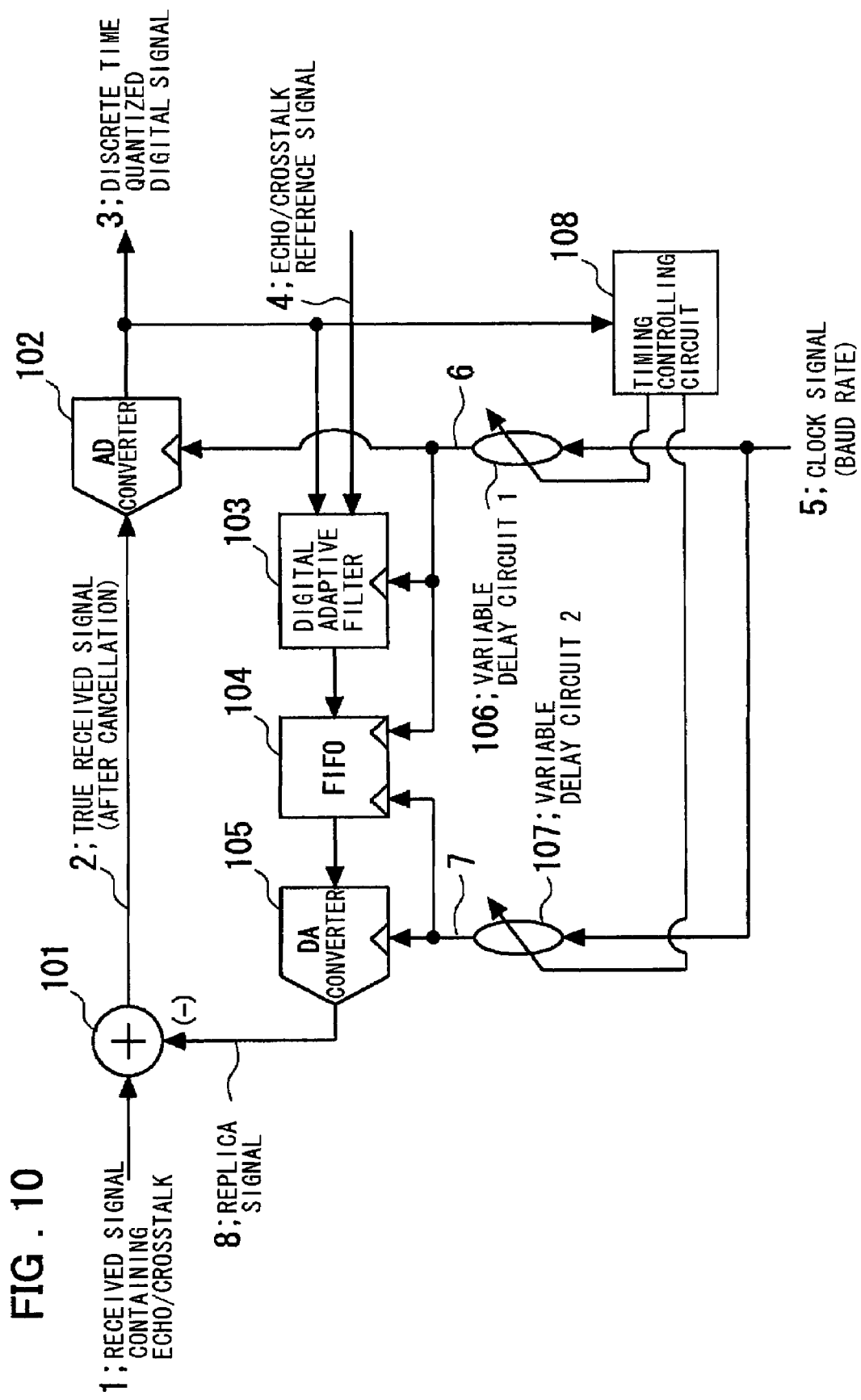
FIG. 10 shows the structure of a modification of the present invention.

FIG. 10 shows the configuration of another embodiment of the present invention. The canceller circuit of the present embodiment includes, within the circuit, a timing controlling circuit 108 for receiving the quantized discrete-time output digital signal 3 of the AD converter 102 to control the delay of the first and second variable delay circuits 106, 107. In the phase control training mode, the timing controlling circuit 108 performs delay control of the first and second variable delay circuits 106 and 107, as explained with reference to FIGS. 4 to 6, while controlling the delay of the first variable delay circuit 106, during the normal operation, as explained with reference to FIG. 7. In this delay control, the timing phase is controlled based on the signal sampled at the baud rate, and phase detection is made such that the power over a preset time duration of the sampled output digital signal 3 will be maximum. Or, the technique disclosed in the aforementioned Non-Patent Document 2 may be used to control the timing phase.

Figure 11:
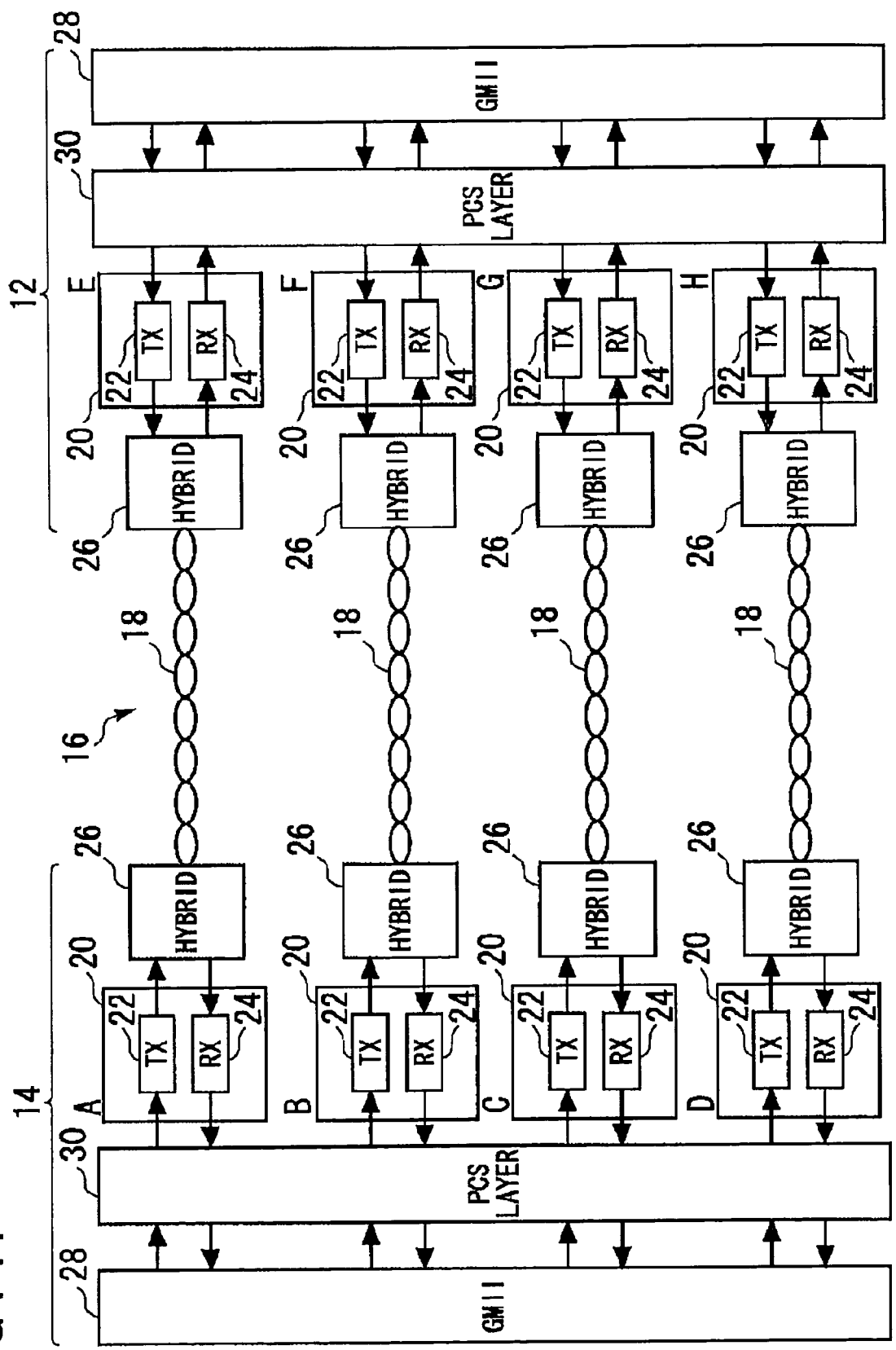
FIG. 11 shows an example of a full-duplex bidirectional transmission system having a hybrid and a canceller.

The canceller circuit of the above-described embodiment may preferably be used with advantage not only in the Gigabit Ethernet (registered trademark) shown in FIG. 11, but also in the 10 Gbit Ethernet (registered trademark) of the next-generation 10 Gbps (10 gigabits/sec) copper cable. Although the present invention has so far been explained in connection with the preferred embodiments, the present invention is not limited to these embodiments, and may, of course, comprise various modification or corrections that may be within the reach of those skilled in the art.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A canceller circuit comprising:
a subtractor, receiving an analog received signal and a replica signal of noise, for carrying out subtraction on the received signal and the replica signal in a continuous time analog domain;
an analog-to-digital converter for converting an analog signal output from said subtractor to a digital signal;
an adaptive filter, receiving a noise reference signal and an output signal of said analog-to-digital converter, for outputting the replica signal, as a digital signal;
a digital-to-analog converter for receiving and converting a digital signal output from said adaptive filter, to an analog signal, and for supplying the analog signal to said subtractor as said replica signal; and
a control circuit for variably controlling the sampling phase in said digital-to-analog converter independently of the sampling phase on the side of said analog-to-digital converter, the phase of the signal waveform of the replica signal, output from said digital-to-analog converter, being controlled by said control circuit to be coincident with the phase of said noise received.

2. The canceller circuit according to claim 1, further comprising:
a circuit, receiving the digital signal output from said adaptive filter, for effecting clock signal replacement from a sampling clock signal on the side of said analog-to-digital converter to a sampling clock signal on the side of said digital-to-analog convener to send the received digital signal to said digital-to-analog converter based an the sampling clock signal on the side of said digital-to-analog converter.

3. The canceller circuit according to claim 1, wherein the sampling frequency on the side of said analog-to-digital converter and the sampling frequency on the side of said digital-to-analog converter is equal to the number of times of modulation per second.

4. The canceller circuit according to claim 1, wherein said digital-to-analog converter includes a filter for outputting a continuous time analog signal obtained on cutting frequency components not lower than one-half the sampling frequency from a discrete time analog signal obtained on sampling an input discrete time digital signal.

5. The canceller circuit according to claim 1, wherein the received signal supplied to said subtractor has frequency components not lower than one half the sampling frequency cut off.

6. A transceiver apparatus including said canceller circuit as defined in claim 1.

7. A communication system including a hybrid circuit and a transceiver apparatus on each end of a communication channel fanned by a cable or a wire;
said transceiver apparatus including said canceller circuit as defined in claim 1 to effect full-duplex bidirectional communication.

8. The canceller circuit according to claim 1, wherein said noise comprises one of echo and crosstalk.

9. A canceller circuit comprising:
a subtractor for outputting an analog signal obtained on subtracting an analog signal supplied to a second terminal thereof from an analog signal supplied to a first terminal thereof;
an analog-to-digital converter having an analog input terminal for receiving the analog signal output from said subtractor, said analog-to-digital converter converting the received analog signal to a digital signal to output the digital signal at a digital output terminal thereof;
an adaptive filter having input terminals for receiving the digital output signal output from said analog-to-digital convener and an input noise reference signal and an output terminal for outputting a filter output as a digital signal;
a first-in first-out storage device, receiving the digital signal output from said adaptive filter, to effect writing of the received digital signal based on a write clock signal and to effect reading and outputting of the digital signal based on a read clock to effect clock replacement;
a digital-to-analog converter having a digital input terminal for receiving the digital signal output from said first-in first-out storage device, said digital-to-analog converter converting the received digital signal to an analog signal to output the analog signal at an analog output terminal thereof; and
first and second variable delay circuits for receiving an input clock signal in common and for variably delaying said input clock signal to output delayed input clock signals as first and second clock signals;
wherein said first clock signal, output from said first variable delay circuit, is supplied to said analog-to-digital converter and to said adaptive filter as respective sampling clocks, while said first clock signal is supplied to said first-in first-out storage device as said write clock signal;

wherein said second clock signal, output from said second variable delay circuit, is supplied to said first-in first-out storage device as said read clock signal, while being supplied as a sampling clock for said digital-to-analog converter;

wherein a received signal is supplied to said first input terminal of said subtractor;

wherein the analog signal output from said digital-to-analog convener is supplied to said second input terminal of said subtractor as a replica signal of noise; and wherein a signal corresponding to a received signal from a counterpart device with noise cancelled out is supplied to said analog input terminal of said analog-to-digital converter.

10. The canceller circuit according to claim 9, wherein the frequency of said first and second clock signals is equal to the number of times of modulation per second.

11. The canceller circuit according to claim 9, wherein, in a training mode for phase control, control is performed such that:

(a) in such a state where said reference signal is not supplied to said adaptive filter, the received signal from the counterpart device is not supplied to said subtractor and said replica signal from said digital-to-analog converter is not supplied to said subtractor, a signal fanned solely by noise is supplied to a first input terminal of said subtractor, the delay of first variable delay circuit is variably controlled based on an output signal from said analog-to-digital converter, the phase of said first clock signal is variably controlled, the delay of said second variable delay circuit is not controlled, and an optimum sampling position of said noise in said analog-to-digital converter is detected;

(b) in such a state where a first input terminal of said subtractor is signal-less with there being no received signal nor the noise from said counterpart device, said reference signal being supplied to said adaptiVe filter and where the replica signal from said digital-to-analog converter is supplied to a second input terminal of said subtractor, the delay of said second variable delay circuit is variably controlled based on said output signal of said analog-to-digital converter, the phase of said second clock signal is controlled, the delay of said first variable delay circuit is not controlled, and the phase of the replica signal, output from the digital-to-analog converter, is controlled to be coincident with the phase of the noise received; and (c) the phase of said first and second clock signals is not controlled and is left unattended, with the noise and said replica signal being entered to the first and second input terminals of said subtractor, respectively;

said analog-to-digital converter is supplied with a difference signal of said noise and said replica signal, output from said subtractor; and said adaptive filter is supplied with an output signal of said analog-to-digital converter as an error and with said reference signal and adaptively varying the filter coefficients for decreasing an error between a filter output signal and the noise as a target signal to effect equalization pull-in to cancel the noise from an output of said subtractor.

12. The canceller circuit according to claim 11, wherein in a normal operating mode following the training mode for phase control, a received signal containing the noise is supplied to the first input terminal of said subtractor, wherein said adaptive filter is supplied with said reference signal, said second input terminal of said subtractor is supplied with the replica signal from said digital-to-analog converter; and wherein the delay of said first variable delay circuit is variably controlled based on an output signal of said analog-to-digital converter to variably control the phase of said first clock signal.

13. The canceller circuit according to claim 9, further comprising a timing controller, receiving a digital signal output at a frequency equal to the number of times of modulation per second from said analog-to-digital converter, for controlling the delay time of said first and second variable delay circuits based on the received digital signal.

14. The canceller circuit according to claim 13, wherein said timing controller variably controls the delay of said first and/or second variable delay circuits to maximize the power of said digital signal based on the digital signal from said analog-to-digital converter.

15. A canceller circuit comprising:

a subtractor for subtracting a replica signal of noise from a received signal;

an analog-to-digital converter for converting an analog signal output from said subtractor to a digital from;

an adaptive filter for receiving an output signal from said analog-to-digital converter and an input noise reference signal and for outputting a replica signal of the noise in a digital form;

a digital-to-analog converter for receiving and converting a digital signal output from said adaptive filter to an analog form and for supplying a converted analog signal to said subtractor as said replica signal of noise; and a control circuit for variably controlling the sampling phase in said digital-to-analog convener so that the phase of the replica signal of said noise output from said digital-to-analog converter is brought into coincidence with the phase of noise received by the subtractor.

* * * * *